US010123208B2

(12) United States Patent
Meng et al.

(10) Patent No.: US 10,123,208 B2
(45) Date of Patent: *Nov. 6, 2018

(54) METHOD AND DEVICE FOR CONTROLLING ACCESS

(71) Applicant: Xiaomi Inc., Beijing (CN)

(72) Inventors: Deguo Meng, Beijing (CN); Jia Liu, Beijing (CN); Enxing Hou, Beijing (CN)

(73) Assignee: Xiaomi Inc., Beijing (CN)

( * ) Notice: Subject to any disclaimer, the term of this patent is extended or adjusted under 35 U.S.C. 154(b) by 254 days.

This patent is subject to a terminal disclaimer.

(21) Appl. No.: 14/979,070

(22) Filed: Dec. 22, 2015

(65) Prior Publication Data

US 2016/0308869 A1    Oct. 20, 2016

(30) Foreign Application Priority Data

Apr. 20, 2015    (CN) .......................... 2015 1 0188562

(51) Int. Cl.
*H04L 29/06* (2006.01)
*H04W 12/08* (2009.01)
(Continued)

(52) U.S. Cl.
CPC ........... *H04W 12/08* (2013.01); *H04W 12/04* (2013.01); *H04W 84/12* (2013.01)

(58) Field of Classification Search
CPC ...... H04L 63/10; H04W 12/08; H04W 84/12; H04W 76/02; H04W 48/10; H04W 48/20; H04W 8/22; H04W 48/12; H04W 48/16
See application file for complete search history.

(56) References Cited

U.S. PATENT DOCUMENTS

| 7,281,192 B2 | 10/2007 | Shen et al. |
| 7,779,328 B2 * | 8/2010 | Kim ................. H03M 13/2975 375/295 |

(Continued)

FOREIGN PATENT DOCUMENTS

| CN | 101505545 A | 8/2009 |
| CN | 102595641 A | 7/2012 |

(Continued)

OTHER PUBLICATIONS

Gallager, Robert G., "Low Density Parity-Check Codes", 1963, pp. 1-90, http://www.rle.mit.edu/rgallager/documents/ldpc.pdf.*

(Continued)

*Primary Examiner* — Kambiz Zand
*Assistant Examiner* — Tongoc Tran
(74) *Attorney, Agent, or Firm* — Arch & Lake LLP

(57) ABSTRACT

The present disclosure relates to a method and a device for controlling access to the Internet. The method includes: determining whether a smart device is able to support a Low Density Parity Check Code (LDPC) coding-decoding scheme, broadcasting information about a Wireless Local Area Network (WLAN) to the smart device through a LDPC coding-decoding scheme if it is determined that the smart device is able to support the LDPC coding-decoding scheme, detecting whether the terminal tries to communicate with a router through a LDPC coding-decoding scheme when accessing a WLAN is requested if the smart device is not able to support the LDPC coding-decoding scheme, in response to detection that the terminal would communicate with a router through a LDPC coding-decoding scheme: establishing connection with the router, and notifying the router to broadcast information about the WLAN through a non-LDPC coding-decoding scheme.

20 Claims, 9 Drawing Sheets

(51) Int. Cl.
*H04W 12/04* (2009.01)
*H04W 84/12* (2009.01)

(56) References Cited

U.S. PATENT DOCUMENTS

| | | | | |
|---|---|---|---|---|
| 2005/0054325 | A1* | 3/2005 | Morper | G06F 21/43 455/410 |
| 2006/0258338 | A1* | 11/2006 | Markki | H04W 48/08 455/414.1 |
| 2007/0180344 | A1 | 8/2007 | Jacobsen et al. | |
| 2007/0189256 | A1* | 8/2007 | Oh | H04W 74/06 370/338 |
| 2007/0281617 | A1* | 12/2007 | Meylan | H04W 16/14 455/41.2 |
| 2008/0268882 | A1* | 10/2008 | Moloney | H04L 51/18 455/466 |
| 2008/0298474 | A1* | 12/2008 | Charbit | H04B 7/15592 375/241 |
| 2010/0054173 | A1* | 3/2010 | Kim | H04B 7/155 370/315 |
| 2010/0211846 | A1* | 8/2010 | Matsumoto | H03M 13/116 714/752 |
| 2011/0119567 | A1* | 5/2011 | Tu | H03M 13/235 714/786 |
| 2012/0069830 | A1* | 3/2012 | Shi | H04L 1/0057 370/338 |
| 2012/0218982 | A1 | 8/2012 | Lee et al. | |
| 2013/0201980 | A1* | 8/2013 | Rahul | H04W 88/08 370/338 |
| 2014/0105330 | A1 | 4/2014 | Eroz et al. | |
| 2014/0241332 | A1* | 8/2014 | Yang | H04W 48/12 370/338 |
| 2015/0023291 | A1 | 1/2015 | Lee et al. | |

FOREIGN PATENT DOCUMENTS

| | | |
|---|---|---|
| CN | 103098402 A | 5/2013 |
| CN | 104159269 A | 11/2014 |
| CN | 104272809 A | 1/2015 |
| CN | 104394577 A | 3/2015 |
| CN | 104853401 A | 8/2015 |
| JP | 2005252627 A | 9/2005 |
| JP | 2008517553 A | 5/2008 |
| JP | 2008277883 A | 11/2008 |
| JP | 2013518508 A | 5/2013 |
| JP | 2015070568 A | 4/2015 |
| RU | 2546571 C2 | 4/2015 |
| WO | 2006122225 A3 | 11/2006 |
| WO | WO 2006/122225 A2 | 11/2006 |
| WO | 2013130998 A1 | 9/2013 |

OTHER PUBLICATIONS

International Search Report dated Jan. 21, 2016 for International Application No. PCT/CN2015/090652, 4 pages.
Fritz!!Box Fon WLAN 7340: "Installation, Configuration and Operation," XP055279734, Retrieved from the Internet: https://en.avm.de/fileadmin/user_upload/EN/Manuals/FRITZ_Box/more/Manual_FRITZBox_Fon_WLAN_7340.pdf, Mar. 31, 2011, pp. 1-190.
International Search Report (including English translation) issued in corresponding International Application No. PCT/CN2015/090652, dated Jan. 21, 2016, 4 pages.
Extended European search report issued in corresponding European Application No. 15199562.8, dated Jul. 5, 2016, 7 pages.
Decision on Grant (including English translation) issued in corresponding Russian Patent Application No. 2016102846/08(004272), dated Mar. 15, 2017, 15 pages.
Notification of Reasons for Refusal (including English translation) issued in corresponding Japanese Patent Application No. 2017-513307, dated Jun. 23, 2017, 7 pages.
Chinese Office Action (including English translation) issued in corresponding CN Application No. 201510188562.8, dated Nov. 3, 2017, 9 pages.
Chinese Office Action (including English translation) issued in corresponding CN Patent Application No. 201510188562.8, dated Jul. 13, 2018, 14 pages.

* cited by examiner

Connecting to WLAN
Selecting an available WLAN for
the device to access the network Xiaomi_houenxing ☑ Remember password Next

METHOD AND DEVICE FOR CONTROLLING ACCESS

The present application is based upon and claims priority to Chinese Patent Application No. 201510188562.8, filed Apr. 20, 2015, the entire contents of which are incorporated herein by reference.

TECHNICAL FIELD

The present disclosure generally relates to the field of wireless communication, and more particularly, to a method and a device for controlling access.

BACKGROUND

Low Density Parity Check Code (briefly referred to as LDPC) is a type of linear block code with sparse parity check matrices. It has an excellent performance approximating to the Shannon limit, and also has a low decoding complexity and a flexible structure. Accordingly, LDPC has become a focus of research in the field of coding of channels in recent years.

Since it can effectively speed up a wireless transmission rate, the LDPC coding has been introduced as a selectable coding scheme under IEEE 802.11n. Some high-performance routers and smart mobile phones support such a coding scheme. When a mobile phone supporting the LDPC coding scheme accesses a router supporting the LDPC coding scheme, they will negotiate to use the LDPC coding scheme for subsequent data communication during the establishment of connection, so as to enhance the wireless transmission efficiency.

SUMMARY

According to a first aspect of embodiments of the present disclosure, there is provided a method for controlling access to the Internet including determining, by a terminal, whether a smart device is able to support a Low Density Parity Check Code (LDPC) coding-decoding scheme, broadcasting, by the terminal, information about a Wireless Local Area Network (WLAN) to the smart device through a LDPC coding-decoding scheme if the smart device is able to support the LDPC coding-decoding scheme, detecting, by the terminal whether the terminal tries to communicate with a router through the LDPC coding-decoding scheme when accessing the WLAN if the smart device is not able to support the LDPC coding-decoding scheme, and in response to the detection that the terminal would tries to communicate with a router through a LDPC coding-decoding scheme: establishing, by the terminal, connection with the router, and notifying, by the terminal, the router to broadcast information about the WLAN through a non-LDPC coding-decoding scheme. The information about the WLAN is used for a smart device to access the WLAN via the router.

According to a second aspect of embodiments of the present disclosure, there is provided a method for controlling access to the Internet by a router, including establishing connection with a terminal when a request for accessing a WLAN is received from the terminal, receiving from the terminal a notification message to broadcast information about the WLAN through a non-LDPC coding-decoding scheme, and broadcasting the information about the WLAN through a non-LDPC coding-decoding scheme. The information about the WLAN is used for a smart device to access the WLAN.

According to a third aspect of embodiments of the present disclosure, there is provided a device for controlling access to the Internet, including a processor, and a memory for storing instructions executable by the processor. The processor is configured to cause the device to perform determining whether a smart device is able to support a LDPC coding-decoding scheme, broadcasting information about a WLAN to the smart device through a LDPC coding-decoding scheme if the smart device is able to support the LDPC coding-decoding scheme, detecting whether the device would communicate with a router through the LDPC coding-decoding scheme when accessing the WLAN is requested if the smart device is not able to support the LDPC coding-decoding scheme, and in response to the detection that the device would communicate with a router through a LDPC coding-decoding scheme: establishing connection with the router, and notifying the router to broadcast information about the WLAN through a non-LDPC coding-decoding scheme. The information about the WLAN is used for a smart device to access the WLAN via the router.

According to a fourth aspect of embodiments of the present disclosure, there is provided a device for controlling access to the Internet, including a processor, and a memory for storing instructions executable by the processor. The processor is configured to perform establishing connection with a terminal, receiving from the terminal a notification message to broadcast information about the WLAN through a non-LDPC coding-decoding scheme, and broadcasting the information about the WLAN through a non-LDPC coding-decoding scheme. The information about the WLAN is used for a smart device to access the WLAN.

According to a fifth aspect of embodiments of the present disclosure, there is provided a non-transitory computer-readable storage medium storing instructions that, when being executed by a processor of a terminal, cause the terminal to perform determining whether a smart device is able to support a LDPC coding-decoding scheme, broadcasting information about a WLAN to the smart device through a LDPC coding-decoding scheme if the smart device is able to support the LDPC coding-decoding scheme, detecting whether the terminal would communicate with a router through a LDPC coding-decoding scheme when accessing the WLAN if the smart device is not able to support the LDPC coding-decoding scheme, and in response to the detection that the terminal would communicate with a router through a LDPC coding-decoding scheme: establishing connection with the router, and notifying the router to broadcast information about the WLAN through a non-LDPC coding-decoding scheme. The information about the WLAN is used for a smart device to access the WLAN via the router.

According to a sixth aspect of embodiments of the present disclosure, there is provided a non-transitory computer-readable storage medium storing instructions that, when being executed by a processor of a router, cause the router to perform establishing connection with the terminal when a request for accessing a WLAN is received from a terminal, receiving from the terminal a notification message to broadcast information about the WLAN through a non-LDPC coding-decoding scheme, and broadcasting the information about the WLAN through a non-LDPC coding-decoding scheme. The information about the WLAN is used for a smart device to access the WLAN.

It is to be understood that both the foregoing general description and the following detailed description are exemplary and explanatory only and are not restrictive of the invention, as claimed.

DRAWINGS

The accompanying drawings, which are incorporated in and constitute a part of this specification, illustrate embodiments consistent with the invention and, together with the description, serve to explain the principles of the invention.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims.

Figure 1:
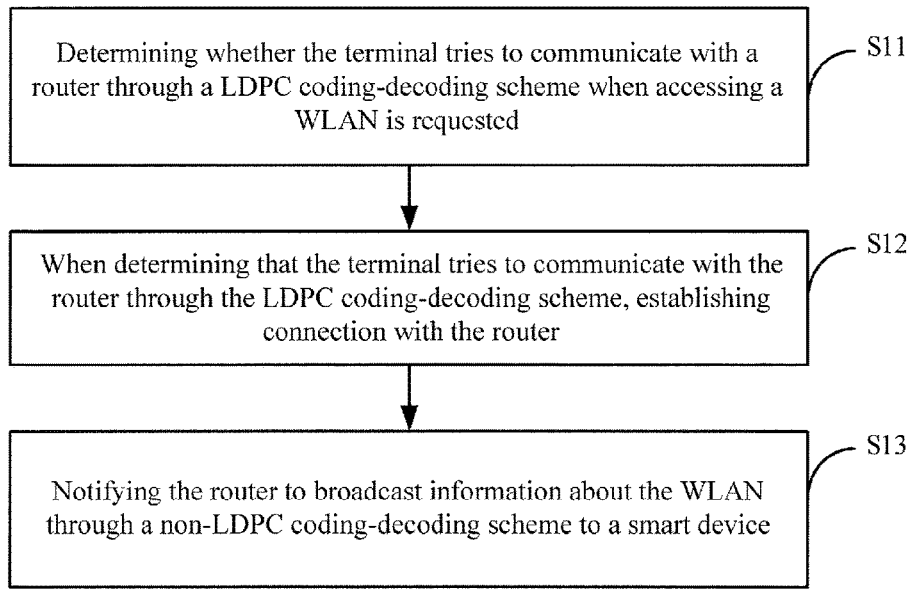
FIG. 1 is a flow chart of a method for controlling access according to an exemplary embodiment.

FIG. 1 is a flow chart of a method for controlling access according to an exemplary embodiment. As shown in FIG. 1, the method is applied in a terminal, and includes the following steps.

In step S11, it is determined whether the terminal tries to communicate with a router through a Low Density Parity Check Code (LDPC) coding-decoding scheme when accessing a Wireless Local Area Network (WLAN) is requested.

In step S12, when it is determined that the terminal tries to communicate with the router through the LDPC coding-decoding scheme, connection with the router is established.

In step S13, the router is notified to broadcast information about the WLAN through a non-LDPC coding-decoding scheme. The information about the WLAN is used for a smart device to access the WLAN via the router.

In the present embodiment, the terminal includes but not limited to, a mobile phone, a notebook computer, a tablet computer or the like. The terminal, the router and the smart device are within the same wireless local area network WLAN. The router is an accessing device, and the terminal and the smart device can access the WLAN via the router, and in turn access the Internet. The smart device includes but not limited to, a television, a refrigerator, a microwave oven, a camera or the like.

The information about the WLAN includes but not limited to a WLAN ID and a password. The ID can be a Service Set Identifier (briefly referred to as SSID), such as a name of a LAN "DLINK1", or the like.

In the present embodiment, optionally, the step of establishing connection with the router comprises negotiating with the router to switch the LDPC coding-decoding scheme to a non-LDPC coding-decoding scheme, and establishing connection with the router through the non-LDPC coding-decoding scheme.

In the present embodiment, optionally, the step of establishing connection with the router comprises negotiating with the router to switch IEEE 802.11n protocol to IEEE 802.11b/g protocol, and establishing connection with the router through a coding-decoding scheme under the IEEE 802.11b/g protocol.

In the present embodiment, optionally, the step of notifying the router to broadcast information about the WLAN through a non-LDPC coding-decoding scheme comprises sending a notification message carrying with a designated coding-decoding scheme to the router, notifying the router to broadcast the information about the WLAN through the designated coding-decoding scheme. The designated coding-decoding scheme is a non-LDPC coding-decoding scheme. In the above method provided by the present embodiment, it is determined whether the terminal itself would communicate with a router through a LDPC coding-decoding scheme when accessing a WLAN is requested; when it is determined that the terminal itself would communicate with the router through the LDPC coding-decoding scheme, connection with the router is established; and the router is notified to broadcast information about the WLAN through a non-LDPC coding-decoding scheme, the information about the WLAN being used for a smart device to access the WLAN via the router. It can enable a smart device without a LDPC coding capability to access a WLAN via a router, and prevent a situation in which the smart device fails to access the WLAN due to inability to recognize a broadcast message coded in LDPC.

Figure 2:
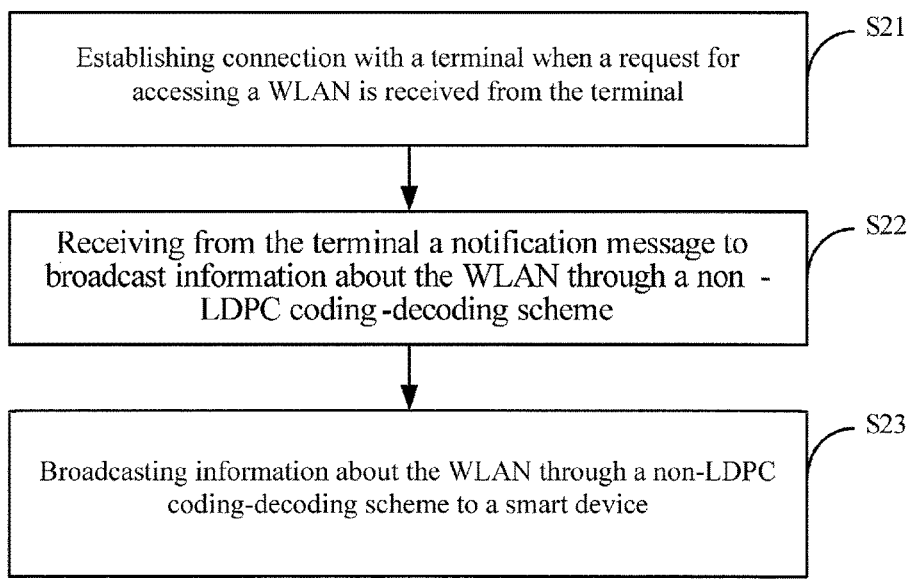
FIG. 2 is a flow chart of a method for controlling access according to another exemplary embodiment.

FIG. 2 is a flow chart of a method for controlling access according to another exemplary embodiment. As shown in FIG. 2, the method is applied in a router, and includes the following steps.

In step S21, when a terminal requests to access a WLAN through a router, connection is established between the router and the terminal.

Thus, after the router establishes connection with the terminal, the terminal can access the Internet via the router.

In step S22, a notification message to broadcast information about the WLAN through a non-LDPC coding-decoding scheme is received from the terminal.

Optionally, the notification message can be a separate message, or a connection-established message can be taken as the notification message. If the connection-established message is provided with identification for notifying the router, the router receiving the connection-established message from the terminal means it receiving the notification message.

In step S23, the information about the WLAN is broadcast through a non-LDPC coding-decoding scheme. The information about the WLAN is used for a smart device to access the WLAN.

Specifically, a message broadcast by the router can be received by a smart device which may be any smart device within the WLAN. Generally, some smart devices have LDPC coding-decoding capability, and some have not. In the present embodiment, the smart device refers to a smart device having not a LDPC coding and decoding capability. Only when the router broadcasts the information about the WLAN through a non-LDPC coding scheme, the smart device can receive the information about the WLAN and parse it, and in turn establish connection with the router. Otherwise, the smart device cannot access the router, resulting failure in connection.

In the present embodiment, optionally, the method further includes receiving an access request sent by the smart device, the access request carrying with the information about the WLAN, and establishing connection with the smart device according to the access request.

In the present embodiment, optionally, the step of broadcasting the information about the WLAN through a non-LDPC coding-decoding scheme includes if the notification message carries with a designated coding-decoding scheme, broadcasting the information about the WLAN through the designated coding-decoding scheme. The designated coding-decoding scheme is a non-LDPC coding-decoding scheme. Alternatively, the set of broadcasting may include if the notification message does not carry with a designated coding-decoding scheme, broadcasting the information about the WLAN through a non-LDPC coding-decoding scheme.

In the present embodiment, optionally, the step of establishing connection with the terminal comprises negotiating with the terminal to switch a LDPC coding-decoding scheme to a non-LDPC coding-decoding scheme, and establishing connection with the terminal through the non-LDPC coding-decoding scheme.

In the present embodiment, optionally, the step of establishing connection with the terminal comprises negotiating with the terminal to switch IEEE 802.11n protocol to IEEE 802.11b/g protocol, and establishing connection with the terminal through a coding-decoding scheme under the IEEE 802.11b/g protocol.

In the above method provided by the present embodiment, when accessing a WLAN through a terminal is requested, connection is established with the terminal, a notification message to broadcast information about the WLAN through a non-LDPC coding-decoding scheme is received from the terminal, and the information about the WLAN is broadcast through a non-LDPC coding-decoding scheme. The information about the WLAN is used for a smart device to access the WLAN. It can enable a smart device without a LDPC coding capability to access a WLAN via a router, and prevent a situation in which the smart device fails to access the WLAN as a result of it cannot recognize a broadcast message coded in LDPC.

Figure 3:
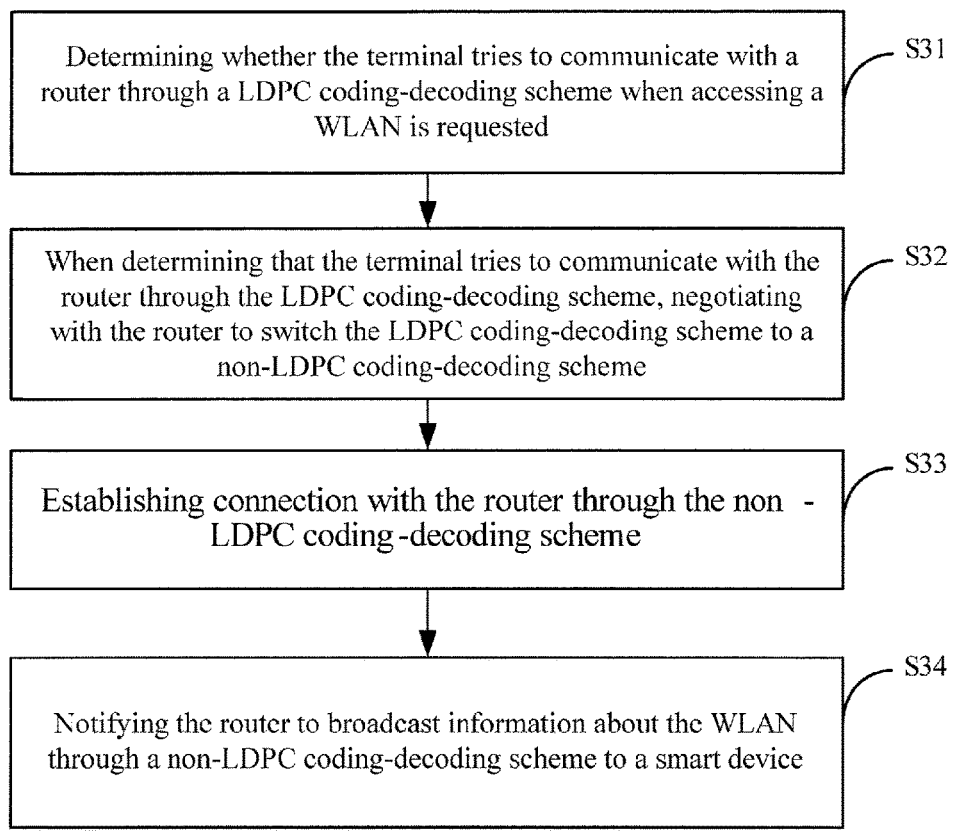
FIG. 3 is a flow chart of a method for controlling access according to another exemplary embodiment.

FIG. 3 is a flow chart of a method for controlling access according to another exemplary embodiment. As shown in FIG. 3, the method is applied in a terminal, and includes the following steps.

In step S31, it is determined whether the terminal tries to communicate with a router through a LDPC coding-decoding scheme when accessing a WLAN is requested.

Specifically, the user can select a WLAN that he wishes to access on the interface of the terminal, and enter a password of the WLAN, then a request for accessing the WLAN is triggered.

In step S32, if it is determined that the terminal tries to communicate with the router through a LDPC coding-decoding scheme, the terminal negotiates with the router to switch the LDPC coding-decoding scheme to a non-LDPC coding-decoding scheme.

Generally, if both of the terminal and the router support the LDPC coding-decoding scheme, they would communicate through the LDPC coding-decoding scheme in default, so as to improve the communication efficiency. In the present embodiment, the terminal initiates a negotiation with the router, to switch to a non-LDPC coding-decoding scheme, to ensure that the terminal would communicate with the router through a non-LDPC coding-decoding scheme currently.

In step S33, connection with the router is established through the non-LDPC coding-decoding scheme.

In step S34, the router is notified to broadcast information about the WLAN through a non-LDPC coding-decoding scheme. The information about the WLAN is used for a smart device to access the WLAN via the router.

Specifically, in case where the terminal and the router do not switch to another protocol, that is, communication between them is conducted still under the IEEE 802.11n protocol, they can select any non-LDPC coding-decoding scheme under the 802.11n protocol to communicate. This is not limited in the present embodiment.

In the present embodiment, optionally, the above steps S32 and S33 can also be replaced by the following steps: when determining that the terminal itself would communicate with the router through the LDPC coding-decoding scheme, the terminal negotiates with the router to switch IEEE 802.11n protocol to IEEE 802.11b/g protocol, and establishes connection with the router through a coding-decoding scheme under the 802.11b/g protocol.

Specifically, since the 802.11b/g protocol does not include the LDPC coding-decoding scheme, when they adopt the 802.11b/g protocol, the terminal and the smart device can adopt any of the coding-decoding schemes under the protocol, all of which are non-LDPC coding-decoding schemes.

In the present embodiment, optionally, the step of notifying the router to broadcast information about the WLAN through a non-LDPC coding-decoding scheme comprises: sending a notification message carrying with a designated coding-decoding scheme to the router, notifying the router to broadcast the information about the WLAN through the designated coding-decoding scheme. The designated coding-decoding scheme is a non-LDPC coding-decoding scheme.

Specifically, the terminal can designate a non-LDPC coding-decoding scheme and notify it to the router. After it receives the notification, the router can broadcast a message in accordance with the non-LDPC coding-decoding scheme designated by the terminal. However, in another embodiment, it is also possible that the terminal does not designate a coding and decoding scheme, and the router can select any non-LDPC coding-decoding scheme to broadcast the message, to ensure that the smart device can receive it.

In the above method provided by the present embodiment, it is determined whether the terminal itself would communicate with a router through a LDPC coding-decoding scheme when accessing a WLAN is requested. If it is determined that the terminal itself would communicate with the router through a LDPC coding-decoding scheme, the terminal negotiates with the router to switch the LDPC coding-decoding scheme to a non-LDPC coding-decoding scheme. And the router is notified to broadcast information about the WLAN through a non-LDPC coding-decoding scheme. The information about the WLAN being used for a smart device to access the WLAN via the router. It can enable a smart device without a LDPC coding capability to access a WLAN via a router, and prevent a situation in which the smart device fails to access the WLAN as a result of it cannot recognize a broadcast message coded in LDPC.

Figure 4:
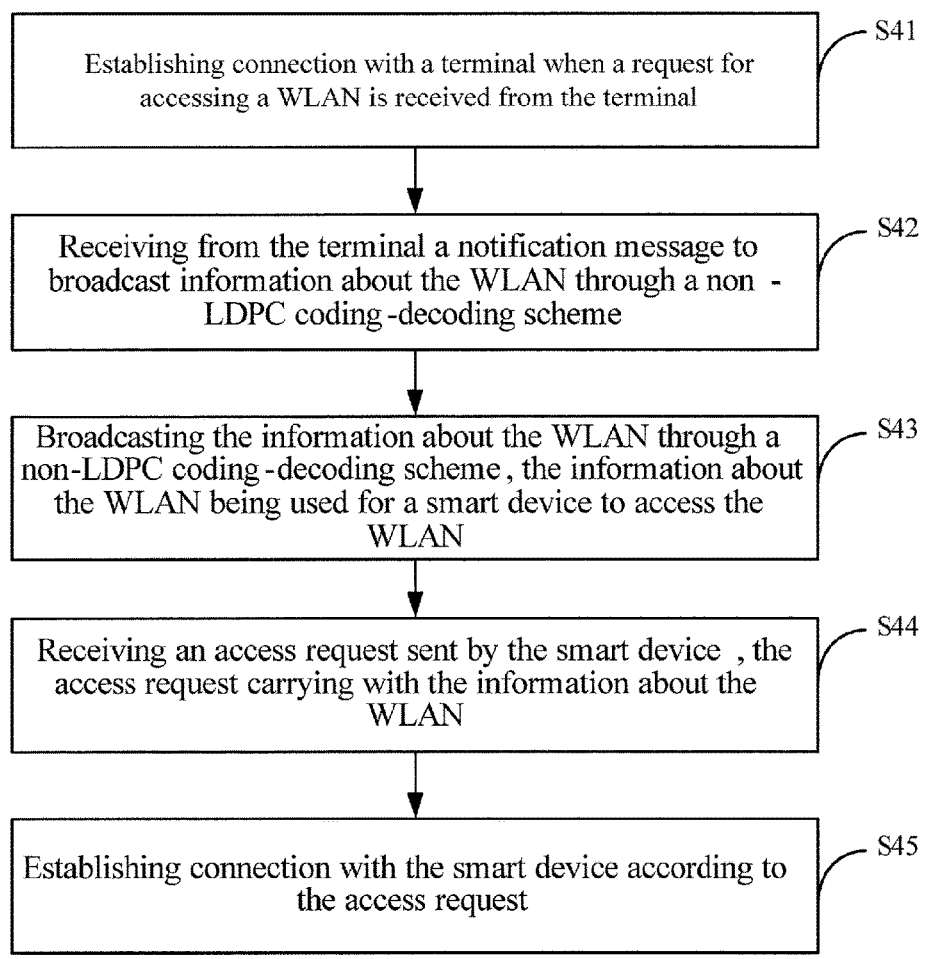
FIG. 4 is a flow chart of a method for controlling access according to another exemplary embodiment.

FIG. 4 is a flow chart of a method for controlling access according to another exemplary embodiment. As shown in FIG. 4, the method is applied in a router, and includes the following steps.

In step S41, when accessing a WLAN through a terminal is requested, connection is established with the terminal.

In the present embodiment, optionally, the step of establishing connection with the terminal includes negotiating with the terminal to switch a LDPC coding-decoding scheme to a non-LDPC coding-decoding scheme, and establishing connection with the terminal through the non-LDPC coding-decoding scheme, or, negotiating with the terminal to switch IEEE 802.11n protocol to IEEE 802.11b/g protocol, and establishing connection with the terminal through a coding-decoding scheme under the IEEE 802.11b/g protocol.

In step S42, a notification message to broadcast information about the WLAN through a non-LDPC coding-decoding scheme is received from the terminal.

In step S43, the information about the WLAN is broadcast through a non-LDPC coding-decoding scheme. The information about the WLAN is used for a smart device to access the WLAN.

Specifically, if the router and the terminal do not switch the protocol, they can select any non-LDPC coding and decoding scheme under the original 802.11n protocol. If they have switched to the 802.11b/g protocol, they can select any coding and decoding scheme under the 802.11b/g protocol. This is not limited in the present embodiment.

In the present embodiment, optionally, the step of broadcasting the information about the WLAN through a non-LDPC coding-decoding scheme comprises if the notification message carries with a designated coding-decoding scheme, broadcasting the information about the WLAN through the designated coding-decoding scheme. The designated coding-decoding scheme is a non-LDPC coding-decoding scheme. Alternatively, if the notification message does not carry with a designated coding-decoding scheme, the step of broadcasting comprises broadcasting the information about the WLAN through a non-LDPC coding-decoding scheme.

In step S44, an access request sent by the smart device is received. The access request carries with the information about the WLAN.

In step S45, connection is established with the smart device according to the access request.

In the above method provided by the present embodiment, when accessing a WLAN through a terminal is requested, connection is established with the terminal. A notification message to broadcast information about the WLAN through a non-LDPC coding-decoding scheme is received from the terminal. The information about the WLAN is broadcast through a non-LDPC coding-decoding scheme. An access request sent by the smart device is received. The access request carries with the information about the WLAN. Connection is established with the smart device according to the access request. It can enable a smart device without a LDPC coding capability to access a WLAN via a router, and prevent a situation in which the smart device fails to access the WLAN due to inability to recognize a broadcast message coded in LDPC.

Figure 5:
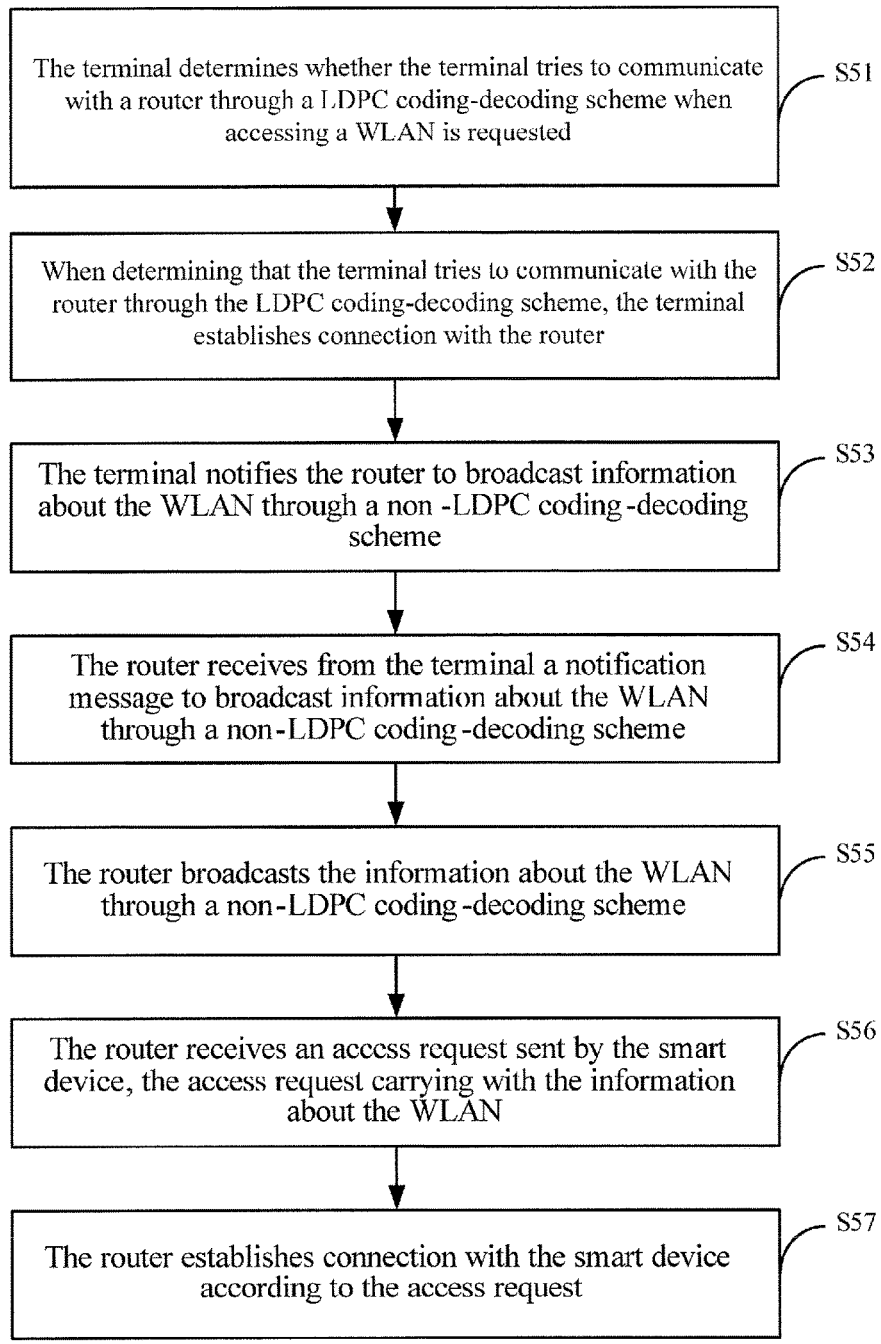
FIG. 5 is a flow chart of a method for controlling access according to another exemplary embodiment.

FIG. 5 is a flow chart of a method for controlling access according to another exemplary embodiment. As shown in FIG. 5, the method is applied in a terminal and a router, including the following steps.

In step S51, the terminal determines whether the terminal tries to communicate with a router through a LDPC coding-decoding scheme when accessing a WLAN is requested.

In step S52, when determining that the terminal tries to communicate with the router through the LDPC coding-decoding scheme, the terminal establishes connection with the router.

In the present embodiment, optionally, establishing connection with the router comprises: negotiating with the router to switch the LDPC coding-decoding scheme to a non-LDPC coding-decoding scheme, and establishing connection with the router through the non-LDPC coding-decoding scheme. Alternatively, establishing connection with the router comprises negotiating with the router to switch the LDPC coding-decoding scheme to a non-LDPC coding-decoding scheme, and establishing connection with the router through the non-LDPC coding-decoding scheme.

In step S53, the terminal notifies the router to broadcast information about the WLAN through a non-LDPC coding-decoding scheme.

In the present embodiment, optionally, this step may include sending a notification message carrying with a designated coding-decoding scheme to the router, and notifying the router to broadcast the information about the WLAN through the designated coding-decoding scheme. The designated coding-decoding scheme is a non-LDPC coding-decoding scheme.

In step S54, the router receives from the terminal a notification message to broadcast information about the WLAN through a non-LDPC coding-decoding scheme.

In step S55, the router broadcasts the information about the WLAN through a non-LDPC coding-decoding scheme.

In the present embodiment, optionally, this step may include if the notification message carries with a designated coding-decoding scheme, broadcasting the information about the WLAN through the designated coding-decoding scheme, wherein the designated coding-decoding scheme is a non-LDPC coding-decoding scheme, or if the notification message does not carry with a designated coding-decoding scheme, broadcasting the information about the WLAN through a non-LDPC coding-decoding scheme.

In step S56, the router receives an access request sent by the smart device, the access request carrying with the information about the WLAN.

In step S57, the router establishes connection with the smart device according to the access request.

Figure 6:
FIG. 6 is a schematic view of a displayed interface of a terminal according to another exemplary embodiment.

Referring to FIG. 6, which is a schematic view of a displayed interface of the terminal, the user can select a WLAN that he wishes to access, enter a password of the WLAN in a box below, then click the "next" button, and a request for accessing the WLAN is triggered. Accordingly, the router will receive a notification, then it broadcasts a message through a non-LDPC coding and decoding scheme to enable the smart device to access the WLAN.

In the above method provided by the present embodiment, the terminal determines whether the terminal itself will communicate with a router through a LDPC coding-decoding scheme when accessing a WLAN is requested. If it will, the terminal establishes connection with the router, and notifies the router to broadcast information about the WLAN through a non-LDPC coding-decoding scheme. After it receives the notification, the router broadcasts the information about the WLAN through a non-LDPC coding-decoding scheme. The information about the WLAN is used for a smart device to access the WLAN via the router. It can enable a smart device without a LDPC coding capability to access a WLAN via a router, and prevent a situation in which the smart device fails to access the WLAN as a result of it cannot recognize a broadcast message coded in LDPC.

Figure 7:
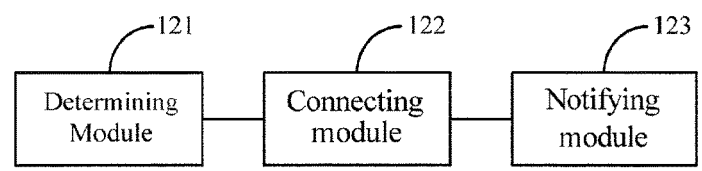
FIG. 7 is a block diagram of a device for controlling access according to another exemplary embodiment.

FIG. 7 is a block diagram of a device for controlling access according to another exemplary embodiment. Referring to FIG. 7, the device includes a determining module 121, a connecting module 122 and a notifying module 123.

The determining module 121 is configured to determining whether the device itself would communicate with a router through a LDPC coding-decoding scheme when accessing a WLAN is requested. The connecting module 122 is configured to, when determining that the device would communicate with the router through the LDPC coding-decoding scheme, establish connection with the router. The notifying module 123 is configured to notify the router to broadcast information about the WLAN through a non-LDPC coding-decoding scheme. The information about the WLAN is used for a smart device to access the WLAN via the router.

Figure 8:
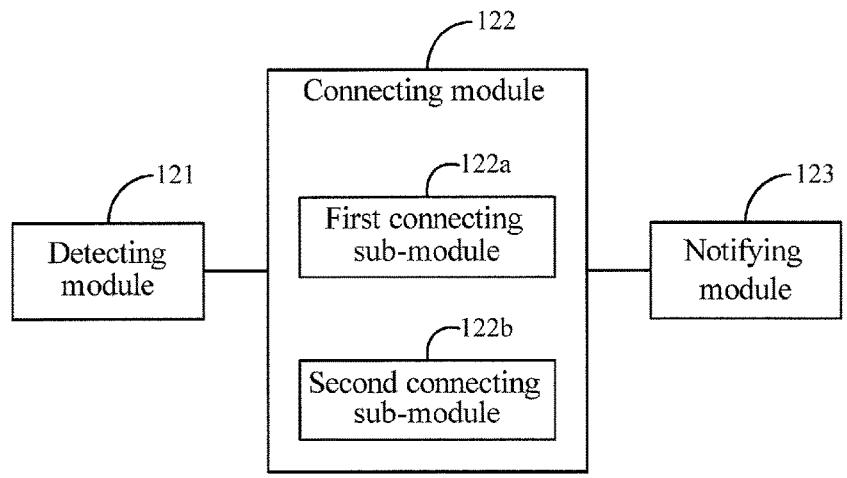
FIG. 8 is a block diagram of a device for controlling access according to another exemplary embodiment.

Referring to FIG. 8, optionally, the connecting module 122 comprises a first connecting sub-module 122a configured to, when determining that the device would communicate with the router through the LDPC coding-decoding scheme, negotiate with the router to switch the LDPC coding-decoding scheme to a non-LDPC coding-decoding scheme, and establish connection with the router through the non-LDPC coding-decoding scheme. The connecting module 122 comprises a second connecting sub-module 122b configured to, when determining that the device would communicate with the router through the LDPC coding-decoding scheme, negotiate with the router to switch IEEE 802.11n protocol to IEEE 802.11b/g protocol, and establish connection with the router through a coding-decoding scheme under the IEEE 802.11b/g protocol.

Figure 9:
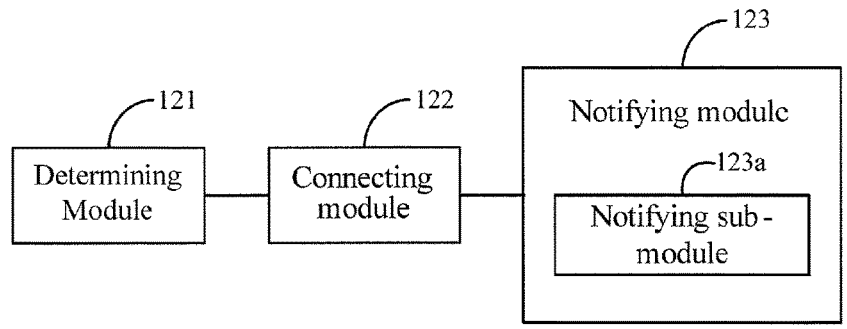
FIG. 9 is a block diagram of a device for controlling access according to another exemplary embodiment.

Referring to FIG. 9, optionally, the notifying module 123 comprises a notifying sub-module 123a configured to send a notification message carrying with a designated coding-decoding scheme to the router, and notify the router to broadcast the information about the WLAN through the designated coding-decoding scheme. The designated coding-decoding scheme is a non-LDPC coding-decoding scheme.

With respect to the devices in the above embodiments, the specific manners for performing operations for individual modules therein have been described in detail in the embodiments regarding the relevant methods, which will not be elaborated herein.

In the above device provided by the present embodiment, it is determined whether the terminal itself would communicate with a router through a LDPC coding-decoding scheme when accessing a WLAN is requested. When it is determined that the terminal itself would communicate with the router through the LDPC coding-decoding scheme, connection with the router is established, and the router is notified to broadcast information about the WLAN through a non-LDPC coding-decoding scheme. The information about the WLAN is used for a smart device to access the WLAN via the router. It can enable a smart device without a LDPC coding capability to access a WLAN via a router, and prevent a situation in which the smart device fails to access the WLAN as a result of it cannot recognize a broadcast message coded in LDPC.

Figure 10:
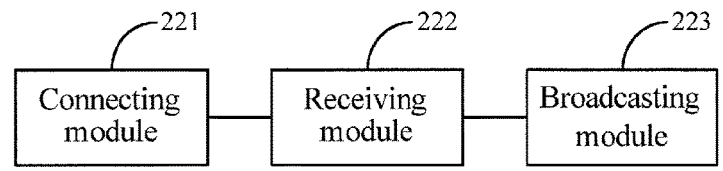
FIG. 10 is a block diagram of a device for controlling access according to another exemplary embodiment.

FIG. 10 is a block diagram of a device for controlling access according to another exemplary embodiment. Referring to FIG. 10, the device includes a connecting module 221, a receiving module 222 and a broadcasting module 223.

The connecting module 221 is configured to, when accessing a WLAN through a terminal is requested, establish connection with the terminal. The receiving module 222 is configured to receive from the terminal a notification message to broadcast information about the WLAN through a non-LDPC coding-decoding scheme. The broadcasting module 223 is configured to broadcast the information about the WLAN through a non-LDPC coding-decoding scheme. The information about the WLAN is used for a smart device to access the WLAN.

In the present embodiment, optionally, the receiving module 222 is further configured to receive an access request sent by the smart device. The access request carries with the information about the WLAN. The connecting module 221 is further configured to establish connection with the smart device according to the access request.

Figure 11:
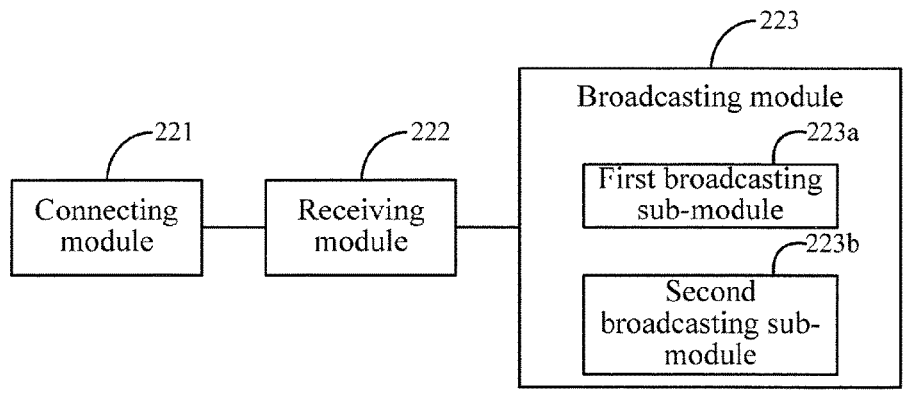
FIG. 11 is a block diagram of a device for controlling access according to another exemplary embodiment.

Referring to FIG. 11, optionally, the broadcasting module 223 comprises a first broadcasting sub-module 223a configured to, if the notification message carries with a designated coding-decoding scheme, broadcast the information about the WLAN through the designated coding-decoding scheme, or a second broadcasting module 223b configured to, if the notification message does not carry with a designated coding-decoding scheme, broadcast the information about the WLAN through a non-LDPC coding-decoding scheme.

Figure 12:
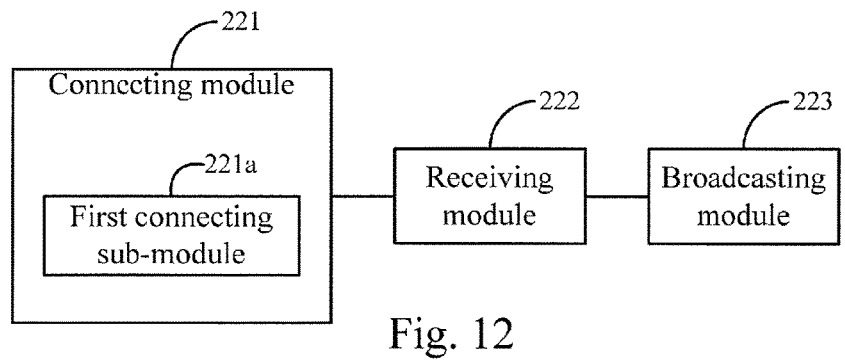
FIG. 12 is a block diagram of a device for controlling access according to another exemplary embodiment.

Referring to FIG. 12, optionally, the connecting module 221 comprises a first connecting sub-module 221a configured to negotiate with the terminal to switch a LDPC coding-decoding scheme to a non-LDPC coding-decoding scheme, and establish connection with the terminal through the non-LDPC coding-decoding scheme.

Figure 13:
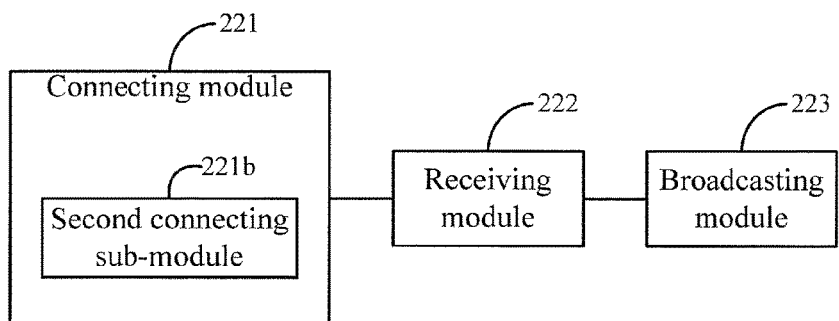
FIG. 13 is a block diagram of a device for controlling access according to another exemplary embodiment.

Referring to FIG. 13, optionally, the connecting module 221 comprises a second connecting sub-module 22 1b configured to negotiate with the terminal to switch IEEE 802.11n protocol to IEEE 802.11b/g protocol, and establish connection with the terminal through a coding-decoding scheme under the IEEE 802.11b/g protocol.

With respect to the devices in the above embodiments, the specific manners for performing operations for individual modules therein have been described in detail in the embodiments regarding the relevant methods, which will not be elaborated herein.

In the above device provided by the present embodiment, when accessing a WLAN through a terminal is requested, connection is established with the terminal. A notification message to broadcast information about the WLAN through a non-LDPC coding-decoding scheme is received from the terminal. The information about the WLAN is broadcast through a non-LDPC coding-decoding scheme, the information about the WLAN being used for a smart device to access the WLAN. It can enable a smart device without a LDPC coding capability to access a WLAN via a router, and prevent a situation in which the smart device fails to access the WLAN as a result of it cannot recognize a broadcast message coded in LDPC.

Figure 14:
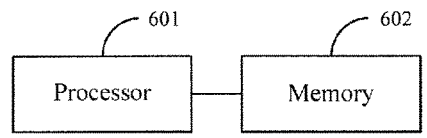
FIG. 14 is a block diagram of a device for controlling access according to another exemplary embodiment.

FIG. 14 is a block diagram of a device for controlling access according to another exemplary embodiment. Referring to FIG. 14, the device includes a processor 601 and a memory 602 for storing instructions executable by the processor. The processor 601 is configured to perform determining whether the terminal itself would communicate with a router through a LDPC coding-decoding scheme when accessing a WLAN is requested, when determining that the terminal itself would communicate with the router through the LDPC coding-decoding scheme, establishing connection with the router, and notifying the router to broadcast information about the WLAN through a non-LDPC coding-decoding scheme. The information about the WLAN is used for a smart device to access the WLAN via the router.

Figure 15:
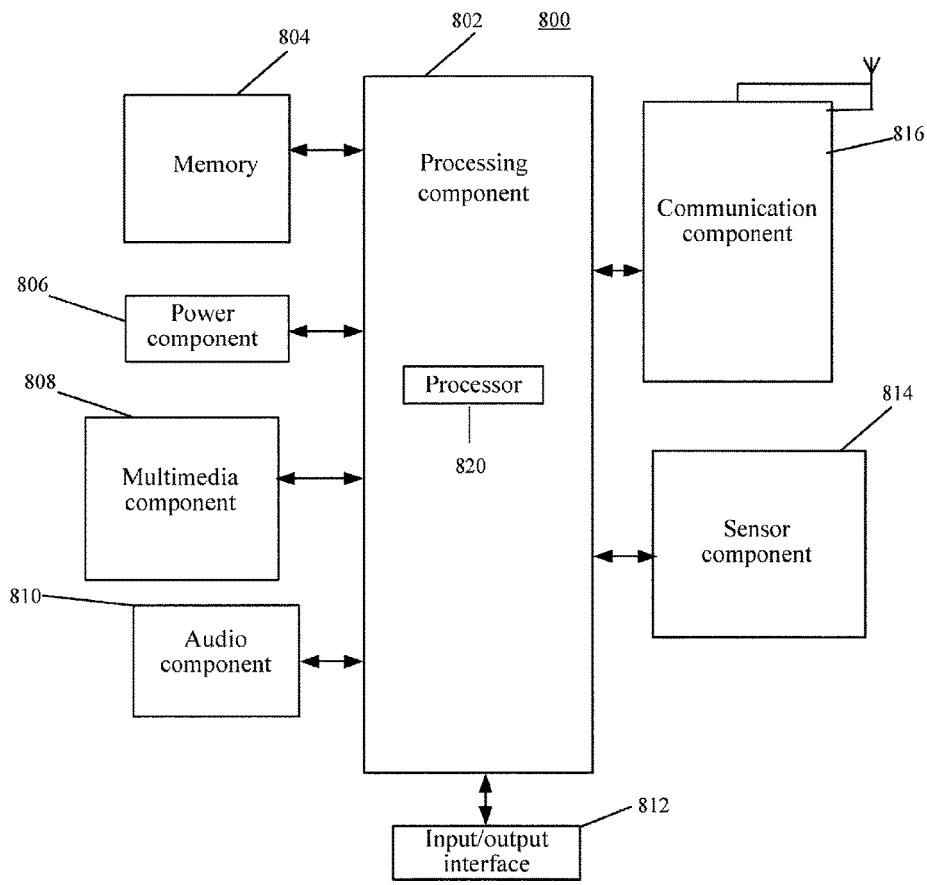
FIG. 15 is a block diagram of a device for controlling access according to another exemplary embodiment.

FIG. 15 is a block diagram of a device 800 for controlling access according to another exemplary embodiment. For example, the device 800 may be a mobile phone, a computer, a digital broadcast terminal, a messaging device, a gaming console, a tablet, a medical device, exercise equipment, a personal digital assistant, and the like.

Referring to FIG. 15, the device 800 may include one or more of the following components: a processing component 802, a memory 804, a power component 806, a multimedia component 808, an audio component 810, an input/output (I/O) interface 812, a sensor component 814, and a communication component 816.

The processing component 802 typically controls overall operations of the device 800, such as the operations associated with display, telephone calls, data communications, camera operations, and recording operations. The processing component 802 may include one or more processors 820 to execute instructions to perform all or part of the steps in the above described methods. Moreover, the processing component 802 may include one or more modules which facilitate the interaction between the processing component 802 and other components. For instance, the processing component 802 may include a multimedia module to facilitate the interaction between the multimedia component 808 and the processing component 802.

The memory 804 is configured to store various types of data to support the operation of the device 800. Examples of such data include instructions for any applications or methods operated on the device 800, contact data, phonebook data, messages, pictures, video, etc. The memory 804 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 806 provides power to various components of the device 800. The power component 806 may include a power management system, one or more power sources, and any other components associated with the generation, management, and distribution of power in the device 800.

The multimedia component 808 includes a screen providing an output interface between the device 800 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 808 includes a front camera and/or a rear camera. The front camera and the rear camera may receive an external multimedia datum while the device 800 is in an operation mode, such as a photographing mode or a video mode. Each of the front camera and the rear camera may be a fixed optical lens system or have focus and optical zoom capability.

The audio component 810 is configured to output and/or input audio signals. For example, the audio component 810 includes a microphone ("MIC") configured to receive an external audio signal when the device 800 is in an operation mode, such as a call mode, a recording mode, and a voice recognition mode. The received audio signal may be further stored in the memory 804 or transmitted via the communication component 816. In some embodiments, the audio component 810 further includes a speaker to output audio signals.

The I/O interface 812 provides an interface between the processing component 802 and peripheral interface modules, such as a keyboard, a click wheel, buttons, and the like. The buttons may include, but are not limited to, a home button, a volume button, a starting button, and a locking button.

The sensor component 814 includes one or more sensors to provide status assessments of various aspects of the device 800. For instance, the sensor component 814 may detect an open/closed status of the device 800, relative positioning of components, e.g., the display and the keypad, of the device 800, a change in position of the device 800 or a component of the device 800, a presence or absence of user contact with the device 800, an orientation or an acceleration/deceleration of the device 800, and a change in temperature of the device 800. The sensor component 814 may include a proximity sensor configured to detect the presence of nearby objects without any physical contact. The sensor component 814 may also include a light sensor, such as a CMOS or CCD image sensor, for use in imaging applications. In some embodiments, the sensor component 814 may also include an accelerometer sensor, a gyroscope sensor, a magnetic sensor, a pressure sensor, or a temperature sensor.

The communication component 816 is configured to facilitate communication, wired or wirelessly, between the device 800 and other devices. The device 800 can access a wireless network based on a communication standard, such as WiFi, 2G, or 3G, or a combination thereof In one exemplary embodiment, the communication component 816 receives a broadcast signal or broadcast associated information from an external broadcast management system via a broadcast channel. In one exemplary embodiment, the communication component 816 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the device 800 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing a method provided by any one of the above embodiments.

In exemplary embodiments, there is also provided a non-transitory computer-readable storage medium including instructions, such as included in the memory 804, executable by the processor 820 in the device 800, for performing the above-described methods. For example, the non-transitory computer-readable storage medium may be a ROM, a RAM, a CD-ROM, a magnetic tape, a floppy disc, an optical data storage device, and the like.

A non-transitory computer readable storage medium, when instructions in the storage medium are executed by a processor of a mobile terminal, the mobile terminal is caused to perform any of the above methods.

In the above non-transitory computer readable storage medium provided by the present embodiment, it is detected whether the terminal itself would communicate with a router through a Low Density Parity Check Code LDPC coding-decoding scheme when accessing a Wireless Local Area Network WLAN is requested; when it is determined that the terminal itself would communicate with the router through the LDPC coding-decoding scheme, connection with the router is established; and the router is notified to broadcast information about the WLAN through a non-LDPC coding-decoding scheme, the information about the WLAN being used for a smart device to access the WLAN via the router. It can enable a smart device without a LDPC coding capability to access a WLAN via a router, and prevent a situation in which the smart device fails to access the WLAN as a result of it cannot recognize a broadcast message coded in LDPC.

Figure 16:
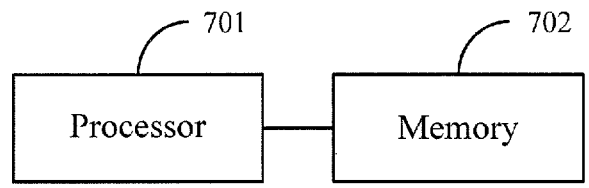
FIG. 16 is a block diagram of a device for controlling access according to another exemplary embodiment.

FIG. 16 is a block diagram of a device for controlling access according to another exemplary embodiment. Referring to FIG. 16, the device includes a processor 701 and a memory 702 for storing instructions executable by the processor. The processor 701 is configured to perform when accessing a WLAN through a terminal is requested, establishing connection with the terminal, receiving from the terminal a notification message to broadcast information about the WLAN through a non-LDPC coding-decoding scheme, and broadcasting the information about the WLAN through a non-LDPC coding-decoding scheme. The information about the WLAN is used for a smart device to access the WLAN.

Figure 17:
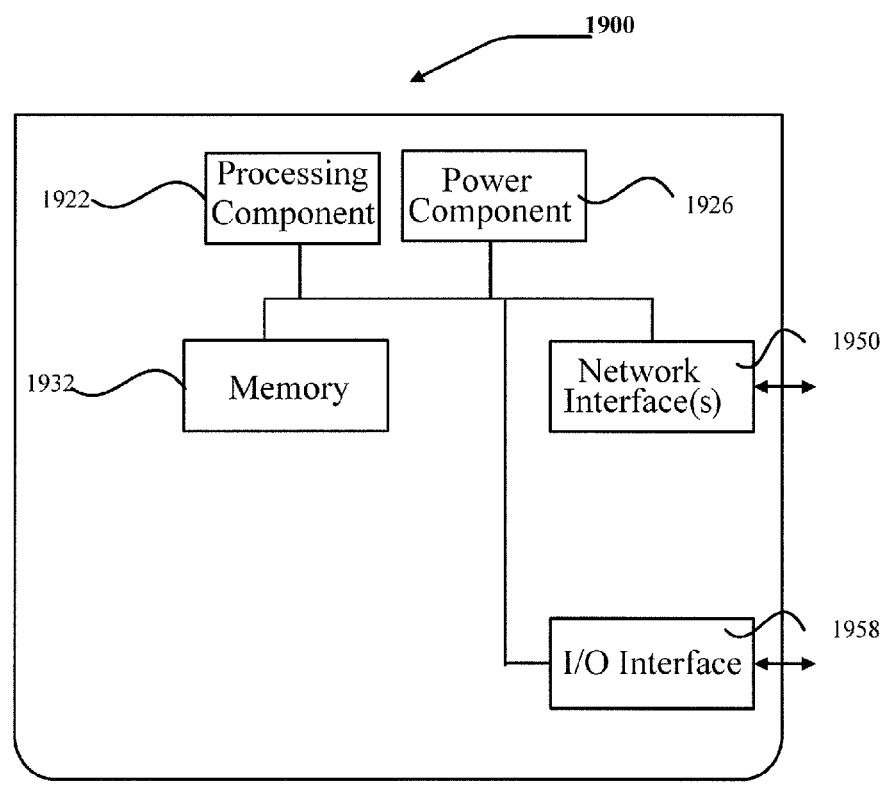
FIG. 17 is a block diagram of a device for controlling access according to another exemplary embodiment.

FIG. 17 is a block diagram of a device 1900 for controlling access according to another exemplary embodiment. For example, the device 1900 may be provided as a server. Referring to FIG. 17, the device 1900 includes a processing component 1922 that further includes one or more processors, and memory resources represented by a memory 1932 for storing instructions executable by the processing component 1922, such as application programs. The application programs stored in the memory 1932 may include one or more modules each corresponding to a set of instructions. Further, the processing component 1922 is configured to execute the instructions to perform the above methods provided by any of the above embodiments.

The device 1900 may also include a power component 1926 configured to perform power management of the device 1900, wired or wireless network interface(s) 1950 configured to connect the device 1900 to a network, and an input/output (I/O) interface 1958. The device 1900 may operate based on an operating system stored in the memory 1932, such as Windows Server™, Mac OS X™, Unix™, Linux™, FreeBSD™, or the like.

In the above device provided by the present embodiment, when accessing a WLAN through a terminal is requested, connection is established with the terminal. A notification message to broadcast information about the WLAN through a non-LDPC coding-decoding scheme is received from the terminal. And the information about the WLAN is broadcast through a non-LDPC coding-decoding scheme. The information about the WLAN is used for a smart device to access the WLAN. It can enable a smart device without a LDPC coding capability to access a WLAN via a router, and prevent a situation in which the smart device fails to access the WLAN as a result of it cannot recognize a broadcast message coded in LDPC.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

What is claimed is:

1. A method for controlling access of a smart device to the Internet via a router, comprising:
   determining, by a terminal, whether or not the smart device is able to support a Low Density Parity Check Code (LDPC) coding-decoding scheme;
   broadcasting, by the terminal, information about a Wireless Local Area Network (WLAN) to the smart device through a LDPC coding-decoding scheme if it is determined that the smart device is able to support the LDPC coding-decoding scheme;
   detecting, by the terminal, whether the terminal tries to communicate with the router through the LDPC coding-decoding scheme when accessing the WLAN if it is determined that the smart device is not able to support the LDPC coding-decoding scheme; and
   in response to the detection that the terminal would communicate with the router through a LDPC coding-decoding scheme:
   establishing, by the terminal, connection with the router;
   notifying, by the terminal, the router to broadcast information about the WLAN through a non-LDPC coding-decoding scheme, the information about the WLAN being used for a smart device to access the WLAN via the router; and
   enabling the smart device to access the WLAN via the router, and in turn access the Internet, wherein the terminal, the router, and the smart device are within the same WLAN.

2. The method according to claim 1, wherein establishing connection with the router comprises: communicating, by the terminal, with the router to switch the LDPC coding-decoding scheme to a non-LDPC coding-decoding scheme; and establishing, by the terminal, connection with the router through the non-LDPC coding-decoding scheme.

3. The method according to claim 1, wherein establishing connection with the router comprises: communicating, by the terminal, with the router to switch IEEE 802.11n protocol to IEEE 802.11b/g protocol; and establishing, by the terminal, connection with the router through a coding-decoding scheme under the IEEE 802.11b/g protocol.

4. The method according to claim 1, wherein notifying the router to broadcast information about the WLAN through a non-LDPC coding-decoding scheme comprises: sending, by the terminal, a notification message carrying with a designated coding-decoding scheme to the router, and notifying the router to broadcast the information about the WLAN through the designated coding-decoding scheme, wherein the designated coding-decoding scheme is a non-LDPC coding-decoding scheme.

5. A method for controlling access of a smart device to the Internet by a router, comprising:
establishing connection with a terminal when a request for accessing a WLAN is received from the terminal;
receiving from the terminal a notification message to broadcast information about the WLAN through a non-LDPC coding-decoding scheme if the terminal determines that the smart device is not able to support the LDPC coding-decoding scheme;
broadcasting the information about the WLAN through a non-LDPC coding-decoding scheme, the information about the WLAN being used for the smart device to access the WLAN; and
enabling the smart device to access the WLAN via the router, and in turn access the Internet, wherein the terminal, the router, and the smart device are within the same WLAN.

6. The method according to claim 5, wherein the method further comprises:
receiving an access request sent by the smart device, the access request carrying with the information about the WLAN; and establishing connection with the smart device based on the access request.

7. The method according to claim 5, wherein broadcasting the information about the WLAN through a non-LDPC coding-decoding scheme comprises:
if the notification message carries with a designated coding-decoding scheme, broadcasting the information about the WLAN through the designated coding-decoding scheme, wherein the designated coding-decoding scheme is a non-LDPC coding-decoding scheme; or
if the notification message does not carry with a designated coding-decoding scheme, broadcasting the information about the WLAN through a non-LDPC coding-decoding scheme.

8. The method according to claim 5, wherein establishing connection with the terminal comprises: communicating with the terminal to switch a LDPC coding-decoding scheme to a non-LDPC coding-decoding scheme; and establishing connection with the terminal through the non-LDPC coding-decoding scheme.

9. The method according to claim 5, wherein establishing connection with the terminal comprises: communicating with the terminal to switch IEEE 802.11n protocol to IEEE 802.11b/g protocol; and establishing connection with the terminal through a coding-decoding scheme under the IEEE 802.11b/g protocol.

10. A device for controlling access of the smart device to the Internet via a router, comprising:
a processor; and
a memory for storing instructions executable by the processor,
wherein the processor is configured to cause the device to perform:
determining whether or not the smart device is able to support a LDPC coding-decoding scheme;
broadcasting information about a WLAN to the smart device through a LDPC coding-decoding scheme if it is determined that the smart device is able to support the LDPC coding-decoding scheme;
detecting whether the device would communicate with the router through the LDPC coding-decoding scheme when accessing the WLAN is requested if it is determined that the smart device is not able to support the LDPC coding-decoding scheme; and
in response to the detection that the device would communicate with the router through a LDPC coding-decoding scheme:
establishing connection with the router;
notifying the router to broadcast information about the WLAN through a non-LDPC coding-decoding scheme, the information about the WLAN being used for a smart device to access the WLAN via the route; and
enabling the smart device to access the WLAN via the router, and in turn access the Internet, wherein the terminal, the router, and the smart device are within the same WLAN.

11. The device according to claim 10, wherein establishing connection with the router comprises: negotiating with the router to switch the LDPC coding-decoding scheme to a non-LDPC coding-decoding scheme; and establishing connection with the router through the non-LDPC coding-decoding scheme.

12. The device according to claim 10, wherein establishing connection with the router comprises: negotiating with the router to switch IEEE 802.11n protocol to IEEE 802.11b/g protocol; and establishing connection with the router through a coding-decoding scheme under the IEEE 802.11b/g protocol.

13. The device according to claim 10, wherein notifying the router to broadcast information about the WLAN through a non-LDPC coding-decoding scheme comprises: sending a notification message carrying with a designated coding-decoding scheme to the router, and notifying the router to broadcast the information about the WLAN through the designated coding-decoding scheme, wherein the designated coding-decoding scheme is a non-LDPC coding-decoding scheme.

14. A device for controlling access of a smart device to the Internet, comprising:
a processor; and
a memory for storing instructions executable by the processor,
wherein the processor is configured to perform:
establishing connection with a terminal when a request for accessing a WLAN is received from a terminal;
receiving from the terminal a notification message to broadcast information about the WLAN through a non-LDPC coding-decoding scheme if the terminal determines that the smart device is not able to support the LDPC coding-decoding scheme;
broadcasting the information about the WLAN through a non-LDPC coding-decoding scheme, the information about the WLAN being used for smart device to access the WLAN; and
enabling the smart device to access the WLAN via the router, and in turn access the Internet, wherein the terminal, the router, and the smart device are within the same WLAN.

15. The device according to claim 14, wherein the processor is further configured to perform: receiving an access request sent by the smart device, the access request carrying with the information about the WLAN; and establishing connection with the smart device based on the access request.

16. The device according to claim 14, wherein broadcasting the information about the WLAN through a non-LDPC coding-decoding scheme comprises: if the notification message carries with a designated coding-decoding scheme, broadcasting the information about the WLAN through the designated coding-decoding scheme, wherein the designated coding-decoding scheme is a non-LDPC coding-decoding scheme; or if the notification message does not carry with a designated coding-decoding scheme, broadcasting the information about the WLAN through a non-LDPC coding-decoding scheme.

17. The device according to claim 14, wherein establishing connection with the terminal comprises: negotiating with the terminal to switch a LDPC coding-decoding scheme to a non-LDPC coding-decoding scheme; and establishing connection with the terminal through the non-LDPC coding-decoding scheme.

18. The device according to claim 14, wherein establishing connection with the terminal comprises: negotiating with the terminal to switch IEEE 802.11n protocol to IEEE 802.11b/g protocol; and establishing connection with the terminal through a coding-decoding scheme under the IEEE 802.11b/g protocol.

19. A non-transitory computer-readable storage medium storing instructions that, when being executed by a processor of a terminal, cause the terminal to perform:
   determining whether or not a smart device is able to support a LDPC coding-decoding scheme;
   broadcasting, by the terminal, information about a WLAN to the smart device through a LDPC coding-decoding scheme if it is determined that the smart device is able to support the LDPC coding-decoding scheme;
   detecting whether the terminal would communicate with a router through the LDPC coding-decoding scheme when accessing the WLAN is requested if it is determined that the smart device is not able to support the LDPC coding-decoding scheme; and
   in response to the detection that the terminal would communicate with the router through a LDPC coding-decoding scheme:
   establishing connection with the router;
   notifying the router to broadcast information about the WLAN through a non-LDPC coding-decoding scheme, the information about the WLAN being used for a smart device to access the WLAN via the router; and
   enabling the smart device to access the WLAN via the router, and in turn access the Internet, wherein the terminal, the router, and the smart device are within the same WLAN.

20. A non-transitory computer-readable storage medium storing instructions that, when being executed by a processor of a router, cause the router to perform:
   establishing connection with a terminal when a request for accessing a WLAN is received from the terminal;
   receiving from the terminal a notification message to broadcast information about the WLAN through a non-LDPC coding-decoding scheme if the terminal determines that a smart device is not able to support the LDPC coding-decoding scheme;
   broadcasting the information about the WLAN through a non-LDPC coding-decoding scheme, the information about the WLAN being used for the smart device to access the WLAN; and
   enabling the smart device to access the WLAN via the router, and in turn access the Internet, wherein the terminal, the router, and the smart device are within the same WLAN.

* * * * *